United States Patent
Takaki et al.

(10) Patent No.: US 12,473,714 B2
(45) Date of Patent: Nov. 18, 2025

(54) WORK VEHICLE WITH DUST INTRUSION PREVENTION MECHANISM

(71) Applicant: KUBOTA CORPORATION, Osaka (JP)

(72) Inventors: Satoshi Takaki, Sakai (JP); Takahiro Usami, Sakai (JP); Junichi Murakami, Sakai (JP); Taketo Kimura, Sakai (JP); Kosuke Hattori, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 314 days.

(21) Appl. No.: 18/319,485

(22) Filed: May 18, 2023

(65) Prior Publication Data

US 2023/0374752 A1     Nov. 23, 2023

(30) Foreign Application Priority Data

May 23, 2022    (JP) .................. 2022-083891

(51) Int. Cl.
*E02F 9/16*      (2006.01)
*E02F 9/08*      (2006.01)

(52) U.S. Cl.
CPC ............ *E02F 9/163* (2013.01); *E02F 9/0808* (2013.01); *E02F 9/0866* (2013.01); *E02F 9/166* (2013.01)

(58) Field of Classification Search
CPC ....... E02F 9/0808; E02F 9/0866; E02F 9/163; E02F 9/166
See application file for complete search history.

(56) References Cited

FOREIGN PATENT DOCUMENTS

| CN | 204837074 U | * 12/2015 | ............. A01D 41/00 |
|---|---|---|---|
| CN | 208159294 U | * 11/2018 | |
| JP | 5314177 B2 | 10/2012 | |
| JP | 2018121606 A | * 8/2018 | ............. A01D 67/02 |

OTHER PUBLICATIONS

Japanese Office Action for corresponding JP Application No. 2022-083891, Feb. 18, 2025 (w/ machine translation).
Decision to Grant a Patent for corresponding JP Application No. 2022-083891, Apr. 1, 2025 (w/ machine translation).

* cited by examiner

*Primary Examiner* — Edwin A Young
(74) *Attorney, Agent, or Firm* — MORI & WARD, LLP

(57) ABSTRACT

A work vehicle includes a cab frame and a vehicle body frame having a vehicle body front portion and a vehicle body rear portion. The vehicle body rear portion includes an upper support frame, and a first support base provided on the upper support frame in a height direction. The first support base supports the cab frame rotatably about a cab rotational axis extending in the width direction. A cover is attached to the cab frame to cover a space provided above the upper support frame in the height direction when the cab frame is mounted on the vehicle body front portion. A first dust intrusion prevention mechanism is configured to overlap with a gap defined by the cab frame, the upper support frame, the first support base, and the cover when viewed in the width direction when the cab frame is mounted on the vehicle body front portion.

20 Claims, 14 Drawing Sheets

WORK VEHICLE WITH DUST INTRUSION PREVENTION MECHANISM

CROSS-REFERENCE TO RELATED APPLICATIONS

The present application claims priority under 35 U. S. C. § 119 to Japanese Patent Application No. 2022-083891, filed May 23, 2022. The contents of this application are incorporated herein by reference in their entirety.

BACKGROUND OF THE INVENTION

Field of the Invention

The present invention relates to a work vehicle.

Discussion of the Background

Japanese Patent No. 5314177 discloses a work vehicle of which a cabin can be opened and closed freely.

SUMMARY OF THE INVENTION

According to one aspect of the present disclosure, a work vehicle includes a cab frame, a vehicle body frame, a cover, and a first dust intrusion prevention mechanism. The cab frame defines a cabin. The vehicle body frame includes a vehicle body front portion on which the cab frame is configured to mounted and a vehicle body rear portion provided opposite to the vehicle body front portion in a front-back direction. The vehicle body rear portion includes an engine room, an upper support frame, and a first support base. The upper support frame is provided above the engine room in a height direction perpendicular to the front-back direction. The cover is attached to the cab frame and configured to cover a space provided above the upper support frame in the height direction when the cab frame is mounted on the vehicle body front portion. The cover has a first edge and a second edge opposite to the first edge in a width direction perpendicular to the front-back direction and the height direction. The first support base is provided on the upper support frame opposite to the engine room in the height direction such that the first edge of the cover is configured to abut on the first support base. The first support base supports the cab frame rotatably about a cab rotational axis extending in the width direction such that the cab frame is separable from the vehicle body front portion. The first dust intrusion prevention mechanism is provided between the upper support frame and the cover in the height direction and provided in a gap defined by the cab frame, the upper support frame, the first support base, and the cover as viewed in the width direction when the cab frame is mounted on the vehicle body front portion.

According to another aspect of the present disclosure, a work vehicle includes a cab frame, a cover, and a first dust intrusion prevention mechanism. The cab frame defines a cabin. The vehicle body frame includes a vehicle body front portion and a vehicle body rear portion provided opposite to the vehicle body front portion in a front-back direction. The vehicle body rear portion includes an upper support frame, an engine room, a first support base, and a second support base. The engine room is provided below the upper support frame in a height direction perpendicular to the front-back direction. The first support base and the second support base are provided on the upper support frame opposite to the engine room in the height direction side by side in a width direction perpendicular to the front-back direction and the height direction. The first support base and the second support base support the cab frame rotatably about a cab rotational axis extending in the width direction such that the cab frame is separable from the vehicle body front portion. The cover is attached to the cab frame and is configured to cover a space provided above the upper support frame in the height direction when the cab frame is mounted on the vehicle body front portion and between the first support base and the second support base in the width direction. The first dust intrusion prevention mechanism is provided between the first support base and the second support base in the width direction and between the upper support frame and the cover in the height direction. The first dust intrusion prevention mechanism is provided in a gap defined by the cab frame, the upper support frame, the first support base, and the cover as viewed in the width direction when the cab frame is mounted on the vehicle body front portion.

BRIEF DESCRIPTION OF THE DRAWINGS

A more complete appreciation of the present disclosure and many of the at tendant advantages thereof will be readily obtained as the same becomes better understood by reference to the following detailed description when considered in connection with the accompanying drawings.

DESCRIPTION OF THE EMBODIMENTS

Figure 1:
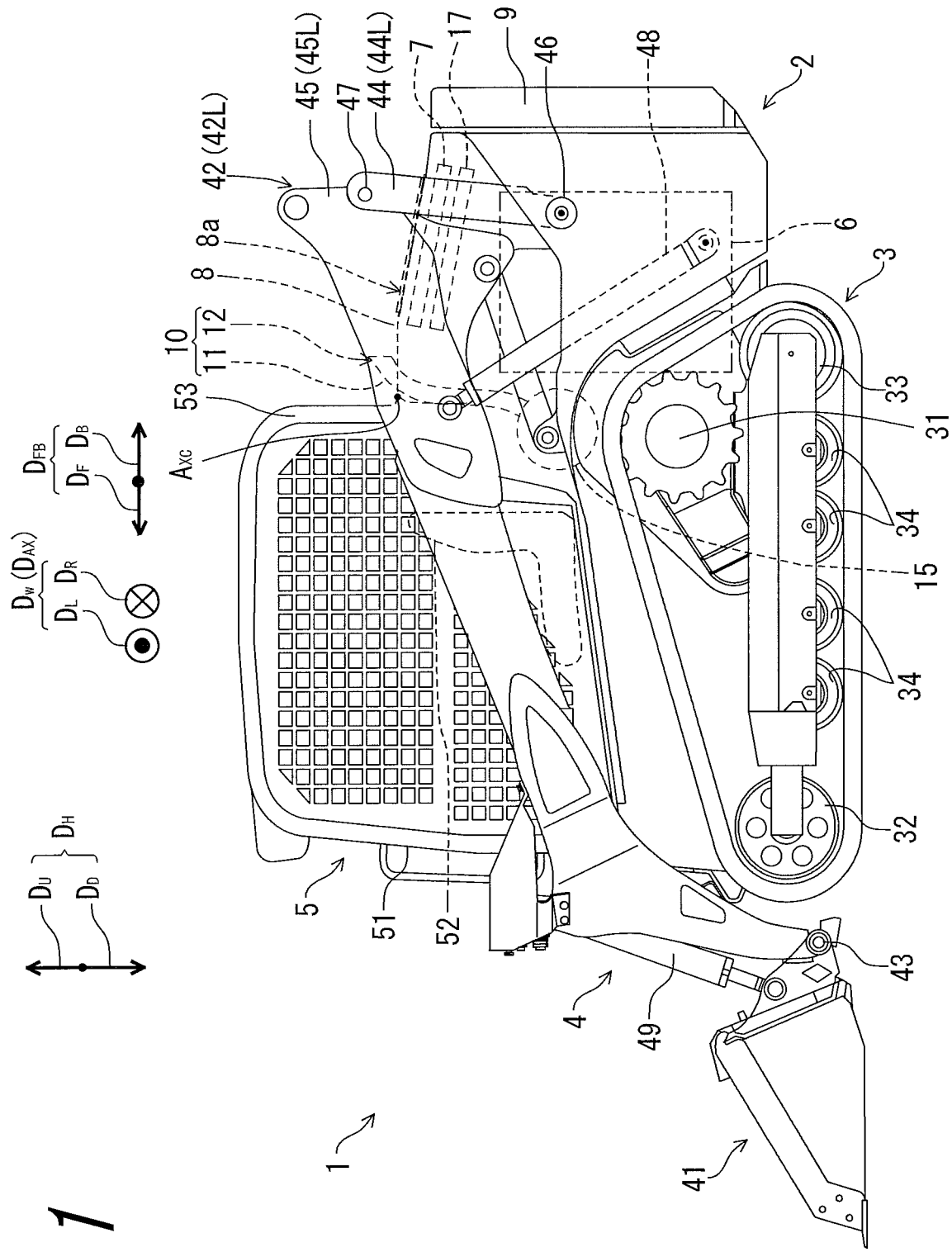
FIG. 1 is a side view of a work vehicle.

Hereinafter, the present invention will be described in detail with reference to the drawings showing embodiments thereof. In the drawings, the same reference numerals denote corresponding or substantially identical configurations.

First Embodiment

<Overall Configuration>

Referring to FIGS. 1-4, a work vehicle 1, such as a compact truck loader, includes an exhaust system 10. A work vehicle 1 includes a body frame 2, a traveling device 3, a working device 4, and a cabin 5. A vehicle body frame 2 supports a traveling device 3, a working device 4 and a cabin 5. In the illustrated embodiment, the traveling device 3 is a crawler traveling device. Therefore, the traveling device 3 includes a drive wheel 31, driven wheels 32 and 33, and a rolling wheel 34. However, the traveling device 3 is not limited to the crawler traveling device. The body frame 2 has a body front portion 2F and a body rear portion 2R opposite to the body front portion 2F. The traveling device 3 may be, for example, a front wheel/rear wheel traveling device or a traveling device having a front wheel and a rear crawler. The working device 4 includes a work equipment (bucket) 41 at the distal end of the working device 4. The proximal end of the working device 4 is attached to the body rear portion 2R of the vehicle body frame 2. The working device 4 includes a pair of arm assemblies 42 for rotatably supporting the bucket 41 via a bucket pivot shaft 43. Each of the pair of arm assemblies 42 includes a lift link 44 and an arm 45.

The lift link 44 is rotatable with respect to the vehicle body frame 2 about a fulcrum shaft 46. The arm 45 is rotatable with respect to the lift link 44 about a joint shaft. The working device 4 further includes a plurality of arm cylinders 48 and at least one equipment cylinder 49. Each of the arm cylinders 48 is rotatably connected to the vehicle body frame 2 and the arm 45, and moves the lift link 44 and the arm 45 to lift and lower the bucket 41. At least one instrument cylinder 49 is configured to tilt the bucket 41.

Figure 2:
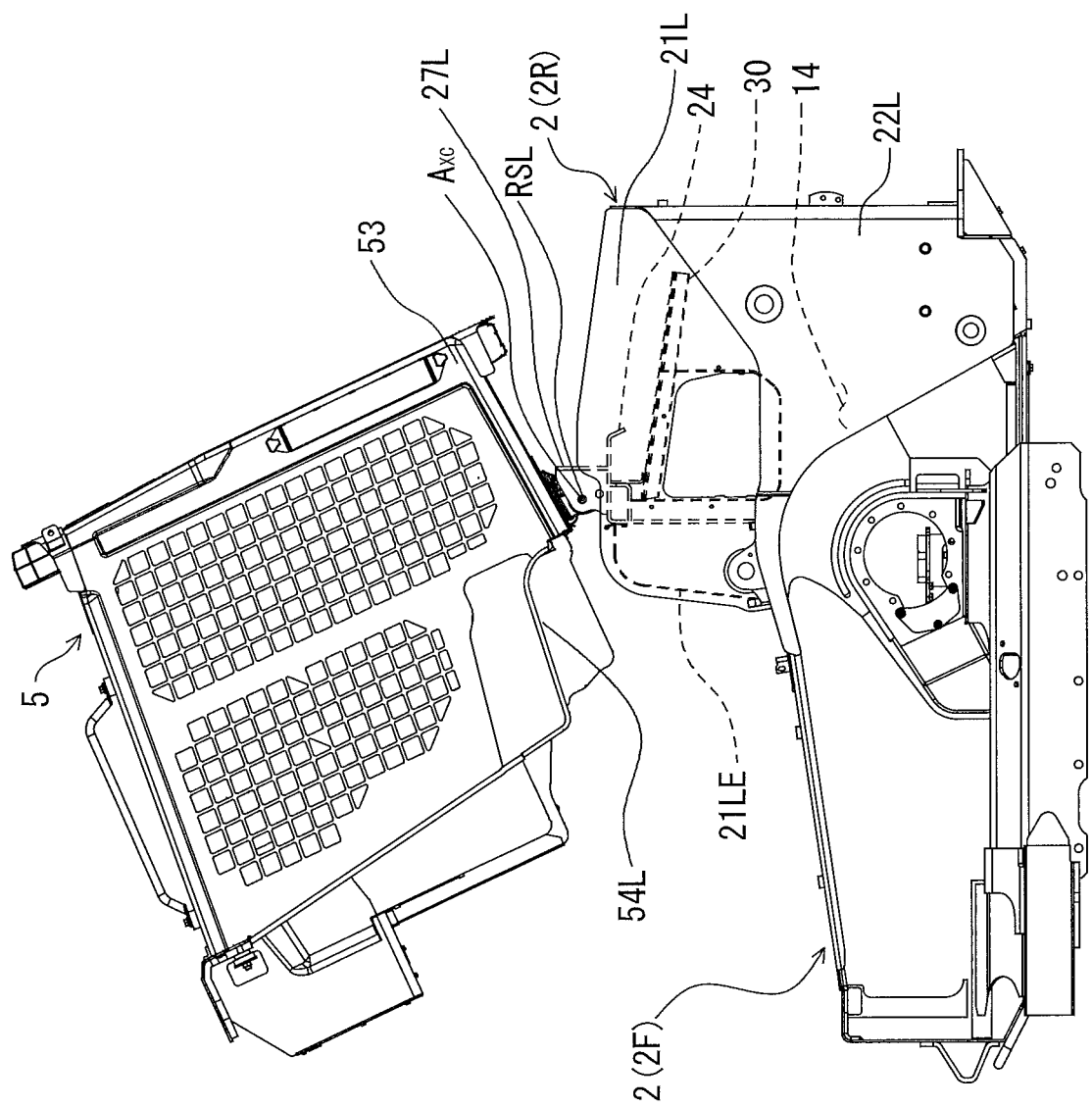
FIG. 2 is a side view of the work vehicle when a cabin is rotated.
Figure 2:
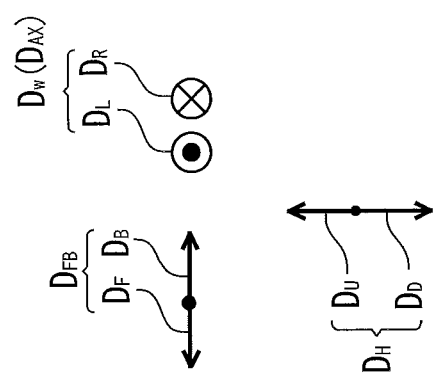
Figure 3:
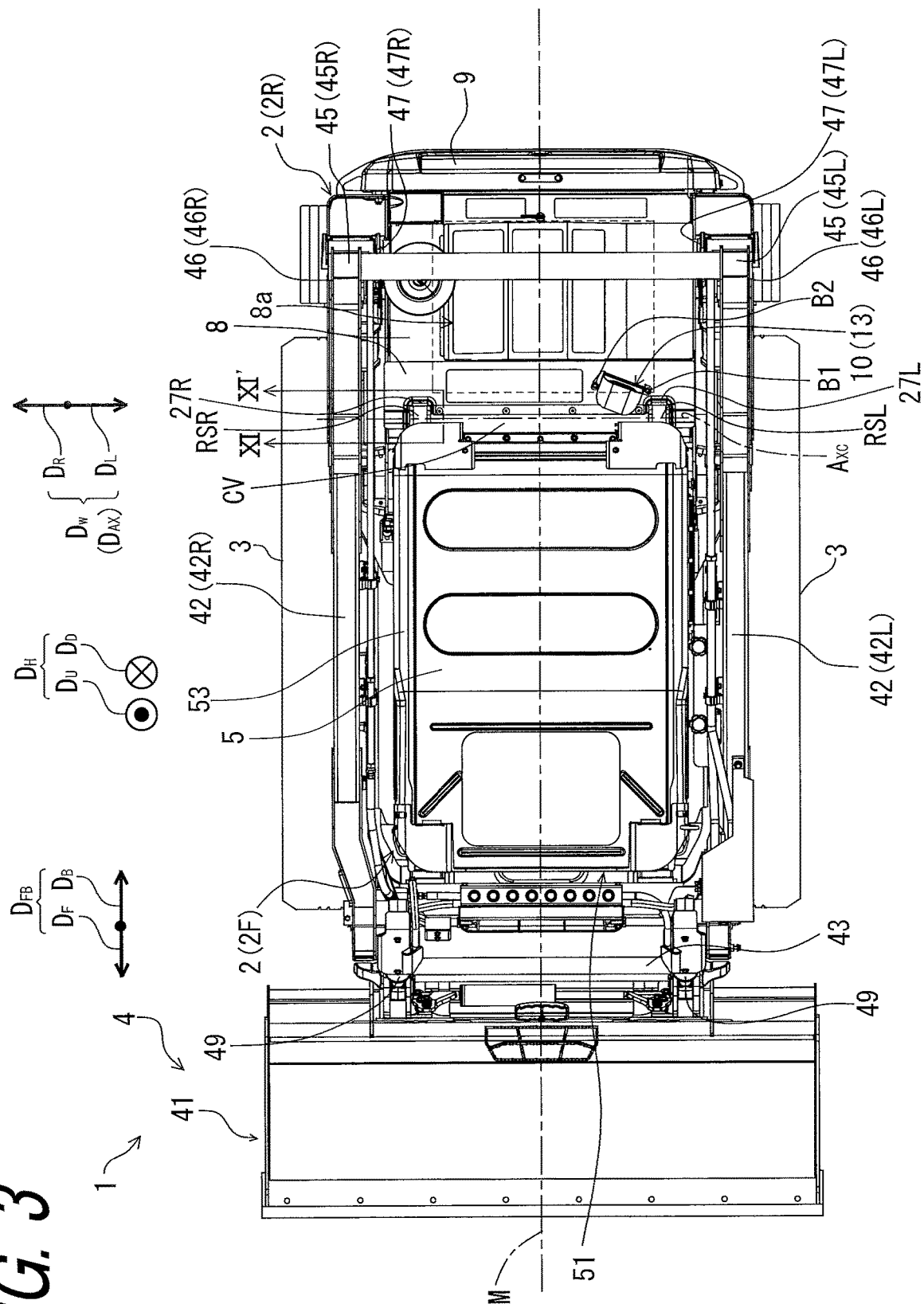
FIG. 3 is a top view of the work vehicle.

The cabin 5 is attached to a vehicle body front portion 2F of the vehicle body frame 2. The work vehicle 1 includes a front door 51 in front of the cabin 5, and a driver seat 52 and an operating device (not illustrated) in the cabin 5. The interior space of the cabin 5 is defined by the cab frame 53. As shown in FIGS. 2 and 3, the cab frame 53 includes a rotational shaft RSL and RSR. The vehicle body rear portion 2R of the vehicle body frame 2 includes a first support base 27L rotatably supporting the rotational shaft RSL, and a second support base 27R rotatably supporting the rotational shaft RSR. In FIGS. 1 to 3, a common cabin rotational axis AXC defined by the rotational shafts RSR and RSR is illustrated. In the following embodiments, a direction along the cabin rotational axis AXC may be referred to as an axial direction DAX. The cab frame 53 is rotatably connected to the vehicle body frame 2 about a cab rotational axis. Referring to FIGS. 1 and 2, the cab frame 53 can be switched between a closed state of being placed on the vehicle body front portion 2F (see FIG. 1) and an open state of being separated from the vehicle body front portion 2F (see FIG. 2) by rotating around the rotational shafts RSL and RSR. In FIG. 2, in order to clarify the structure of the vehicle body frame 2, illustration excluded the vehicle body frame 2, the cabin 5, a first dust intrusion prevention mechanism 60 and a second dust intrusion prevention mechanism 65, which will be described later, are omitted.

In the embodiment according to the present application, a front-back direction $D_{FB}$ (forward direction $D_F$/backward direction $D_B$) means a front-back direction (forward direction/backward direction) as seen from an operator seated on the driver seat 52 of the cabin 5. A left direction $D_L$, right direction $D_R$, width direction $D_W$ means the left direction, the right direction, and the left-right direction as viewed from the operator, respectively. An upward direction $D_U$, a downward direction $D_D$, height direction $D_H$ means an upward direction, a downward direction, and a height direction as viewed from the operator. The front-back, left-right (width), and up-down (height) directions of the work vehicle 1 coincide with the front-back, left-right (width), and up-down (height) directions as viewed from the operator, respectively. In this embodiment, the width direction $D_W$ is the same as the axial direction $D_{AX}$.

Figure 4:
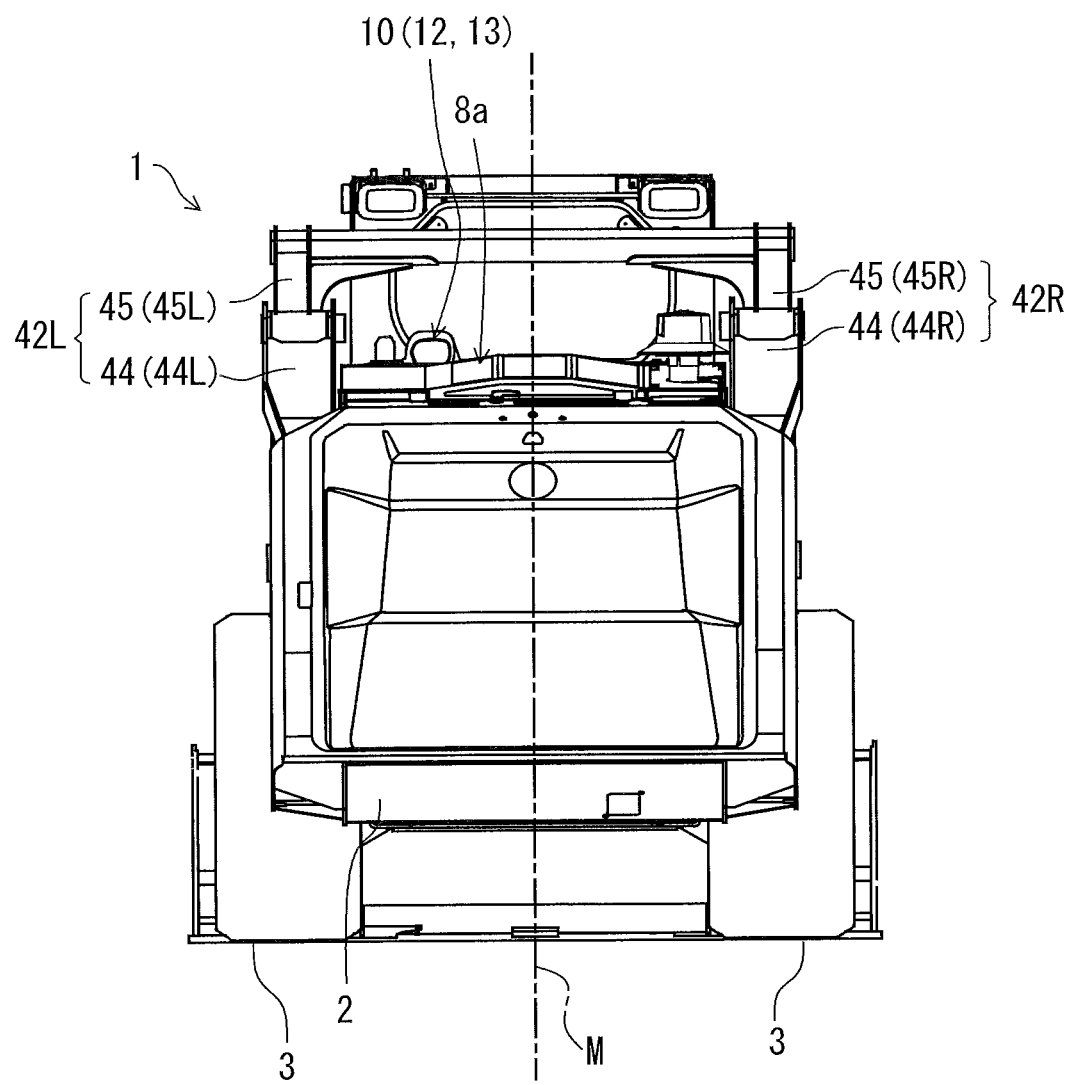
FIG. 4 is a rear view of the work vehicle.

In FIG. 3, one of a pair of arm assemblies 42 is provided on the left side of the cabin 5. The other of the pair of arm assemblies 42 is provided on the right side of the cabin 5. More specifically, one of the arm cylinder 48 and one of the arm 45 are provided on the left side of the cabin 5. The other arm cylinder 48 and the other arm 45 are provided on the right side of the cabin 5. FIG. 1 shows the left side of the work vehicle 1. As shown in FIGS. 3 and 4, the vehicle body frame 2 is approximately plane-symmetric with respect to the vehicle body center plane M, and among the pair of arm assemblies 42, an arm assembly 42 provided on the left side with respect to the vehicle body center plane M is shown as a first arm assembly 42L, and an arm assembly 42 provided on the right side with respect to the vehicle body center plane M is shown as a second arm assembly 42R. A lift link 44 provided on the left side of the vehicle body center plane M is shown as a first lift link 44L, and a lift link 44 provided on the right side of the vehicle body center plane M is shown as a second lift link 44R. An arm 45 provided on the left side of the vehicle body center plane M is shown as a first arm 45L, and an arm 45 provided on the right side of the vehicle body center plane M is shown as a second arm 45R. A fulcrum shaft 46 provided on the left side with respect to the vehicle body center plane M is shown as a first fulcrum shaft 46L, a fulcrum shaft 46 provided on the right side with respect to the vehicle body center plane M is shown as a second fulcrum shaft 46R. A joint shaft 47 provided on the left side with respect to the vehicle body center plane M is shown as a first joint shaft 47L, and a joint shaft 47 provided on the right side with respect to the vehicle body center plane M is shown as a second joint shaft 47R.

Referring to FIG. 1, the work vehicle 1 further includes an engine 6 and a heat exchanger 7 provided at a rear portion 2R of the vehicle body frame 2. The engine 6 is configured to provide a driving force to the traveling device 3 and the working device 4. The heat exchanger 7 is provided with a radiator for cooling the refrigerant of the engine 6. Further preferably, the heat exchanger 7 includes an oil cooler configured to cool hydraulic fluid used in the hydraulic system (e.g., arm cylinder 48 and at least one instrument cylinder 49) of the work vehicle 1. The work vehicle 1 includes a fan 17 for air-cooling the heat exchanger 7. The engine 6 and the heat exchanger 7 are provided between a pair of arm assemblies 42 in the width direction $D_W$ of the work vehicle 1.

The work vehicle 1 further includes a bonnet cover 8 for covering the heat exchanger 7. The bonnet cover 8 further covers the engine 6. An air suction port 8a for taking air into the cover 8 is provided on the upper surface of the bonnet cover 8. The work vehicle 1 further includes a rear bonnet cover 9 provided at the rear end of the vehicle body frame 2. The rear bonnet cover 9 is openable and closable, and thus maintenance personnel can perform maintenance work on the engine 6 and the like.

An exhaust system 10 comprises an exhaust pipe 11, one end of which is connected to an engine 6, and an exhaust port 12 connected to the exhaust pipe 11. More specifically, the exhaust pipe 11 is connected to the engine 6 via an exhaust treatment device 15 configured to treat the exhaust of the engine 6. The exhaust treatment device 15 includes, for example, a particulate removal filter. However, the exhaust treatment device 15 may include a selective reduction catalyst apparatus. Referring to FIG. 3, the exhaust system 10 is provided near the middle between the first arm assembly 42L and the vehicle body center plane M in the width direction $D_W$ of the work vehicle 1.

Figure 5:
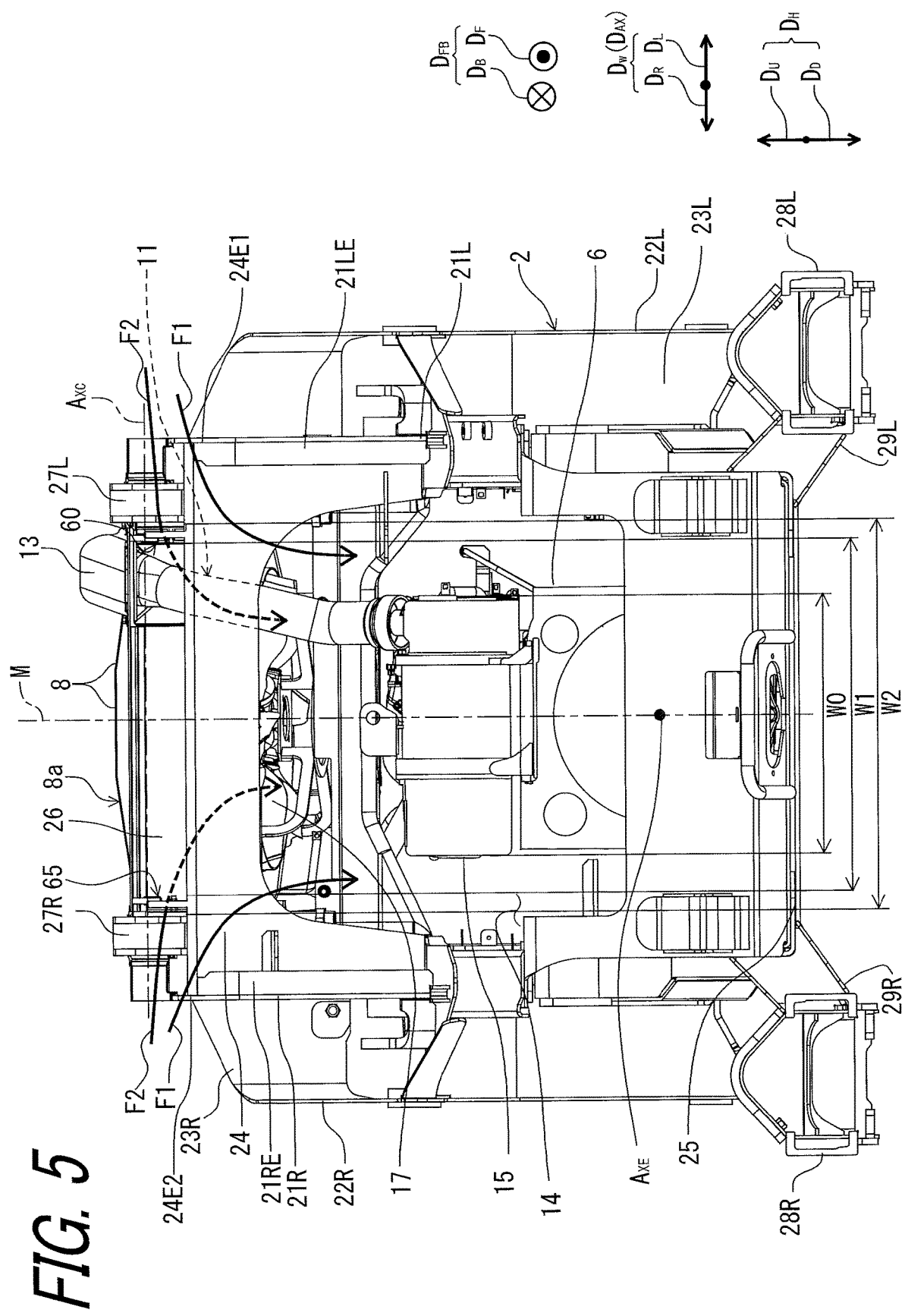
FIG. 5 is a view of a part of the work vehicle as viewed from a front end of the work vehicle toward the rear.

FIG. 5 is a view of a part of the work vehicle 1 viewed from the front end of the work vehicle 1 toward the rear $D_B$. In FIG. 5, illustration other than a vehicle body frame 2, an engine 6, the exhaust treatment device 15, an exhaust system 10, heat exchanger 7, fan 17, and bonnet cover 8 is omitted. Referring to FIG. 5, the vehicle body frame 2 (vehicle body rear portion 2R) includes a first inner wall 21L, second inner wall 21R, a first outer wall 22L, a second outer wall 22R, a first rear wall 23L, a second rear wall 23R, an upper support frame 24, a bottom wall 25, a first support base 27L, a second support base 27R, a first track frame 28L, a second track frame 28R, a first attachment frame 29L, and a second attachment frame 29R.

The first inner wall 21L and the second inner wall 21R connects the upper support frame 24 with the bottom wall 25 and extends in the height direction $D_H$. The first outer wall 22L faces the first inner wall 21L in the width direction $D_W$ and extends in the height direction $D_H$. The second outer wall 22R faces the second inner wall 21R in the width direction $D_W$ and extends in the height direction $D_H$. The first inner wall 21L and the first outer wall 22L are positioned on the left side with respect to the vehicle body center plane M. The second inner wall 21R and the second outer wall 22R is positioned on the right side with respect to the vehicle body center plane M. The first inner wall 21L is positioned between the first outer wall 22L and the vehicle body center plane M in the width direction $D_W$. The second inner wall 21R is positioned between the second outer wall 22R and the vehicle body center plane M in the width direction $D_W$. The first rear wall 23L connects the rear end of the first inner wall 21L and the rear end of the first outer wall 22L. The second rear wall 23R connects the rear end of the second inner wall 21R and the rear end of the second outer wall 22R. The bottom wall 25 connects the lower end of the first inner wall 21L and the lower end of the second inner wall 21R. The upper support frame 24 connects the upper end of the first inner wall 21L and the upper end of the second inner wall 21R. The upper support frame 24 faces the bottom wall 25 in the height direction $D_H$. The upper support frame 24 supports the first support base 27L and the second support base 27R. The first support base 27L and the second support base 27R rotatably support the cab frame 53 and are arranged side by side in the axial direction $D_{AX}$. The first support base 27L is provided at a position away from the vehicle body center M which is the center of the vehicle body frame 2 in the axial direction $D_{AX}$, and rotatably supports the cab frame 53. The upper support frame 24 has a first end 24E1, and a second end 24E2 opposite to the first end 24E1 in the axial direction $D_{AX}$, and supports a first support base 27L between the first end 24E1 and the second end 24E2 in the axial direction $D_{AX}$. The second support base 27R is supported by the upper support frame 24 between the first support base 27L and the second end 24E2 in the axial direction $D_{AX}$, and rotatably supports the cab frame 53. The first support base 27L and the second support base 27R are supported by the upper support frame 24 at positions symmetrical with respect to the vehicle body center M.

The first lift link 44L, the first arm assembly 42L, and the arm cylinder 48 which operates the first arm assembly 42L are arranged in the width direction $D_W$ between the first inner wall 21L and the first outer wall 22L. A first fulcrum shaft 46L for supporting the first lift link 44L is connected to the first inner wall 21L and the first outer wall 22L. The second lift link 44R, the second arm assembly 42R, and the arm cylinder 48 for operating the second arm assembly 42R are provided between the second inner wall 21R and the second outer wall 22R in the width direction $D_W$. A second fulcrum shaft 46R for supporting the second lift link 44R is connected to the second inner wall 21R and the first outer wall 22L.

The first track frame 28L is attached to the lower end of the first inner wall 21L via a first attachment frame 29L. The second track frame 28R is attached to the lower end of the second inner wall 21R via a second attachment frame 29R. Driven wheels 32 and 33 and a rolling wheel 34 are rotatably mounted on the first track frame 28L and the second track frame 28R. The drive wheel 31 is supported by the first inner wall 21L and the second inner wall 21R. The engine 6 is supported by a bottom wall 25 via a damper (not illustrated). In FIG. 4, in order to define the orientation of the engine 6, the crankshaft $A_{XE}$ of the engine 6 is illustrated. The crankshaft $A_{XE}$ extends substantially toward the front-back direction $D_{FB}$ on the vehicle body center plane M.

Figure 6:
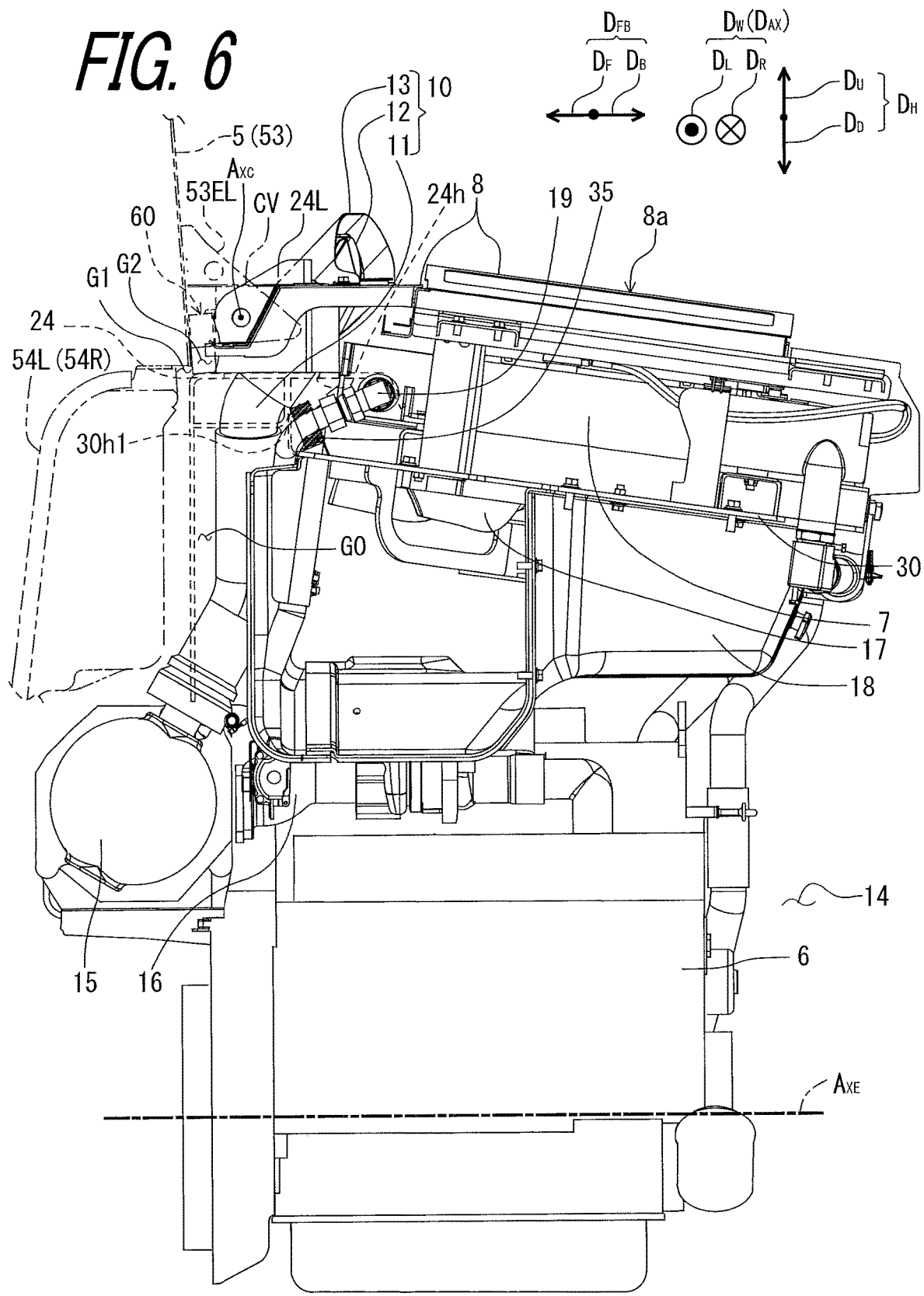
FIG. 6 is a side view of the periphery of the engine.

FIG. 6 is a side view of the periphery of the engine 6 shown in FIG. 5. In FIG. 6, the configuration belonging to the cabin 5 is shown by two dot chain lines, and the vehicle body frame 2 excluding the upper support frame 24 is not shown. The upper support frame 24 is illustrated by dotted lines. Further, the structure of the engine 6 is schematically shown, and a part of the structure of the engine 6 is not shown. As shown in FIG. 6, the heat exchanger 7, the fan 17, and the bonnet cover 8 are attached to the first inner wall 21L and the second inner wall 21R via a stay 30. That is, the bonnet cover 8 is provided on the vehicle body frame 2 in the height direction $D_H$ along the height of the vehicle body frame 2. Referring to FIGS. 2, 5, and 6, the upper support frame 24 has an L-shaped shape bent downward at its front end. The upper support frame 24 has a through hole 24h, and is disposed so that the exhaust pipe 11 passes through the through hole 24h. The through hole 24h communicates with the engine room 14 via a gap G0.

Further, with reference to FIGS. 5 and 6, the fan 17 is located above $D_U$ the engine. The heat exchanger 7 is located above $D_U$ of the fan 17. The bonnet cover 8 having an air suction port 8a is located above $D_U$ of the heat exchanger 7. As the fan 17 rotates, air is sent from the air suction port 8a to the heat exchanger 7. A fan duct 18 is provided between the fan 17 and the engine 6, and the fan duct 18 prevents the air heated through the heat exchanger 7 from flowing into the engine room 14. The fan duct 18 also prevents the outside air containing dust from flowing into the engine room 14. Although the fan 17 is shown in FIG. 5 since an illustration of a part of the fan duct 18 is omitted, the fan 17 is actually not exposed to the engine room 14 because it is covered by the fan duct 18.

Figure 7:
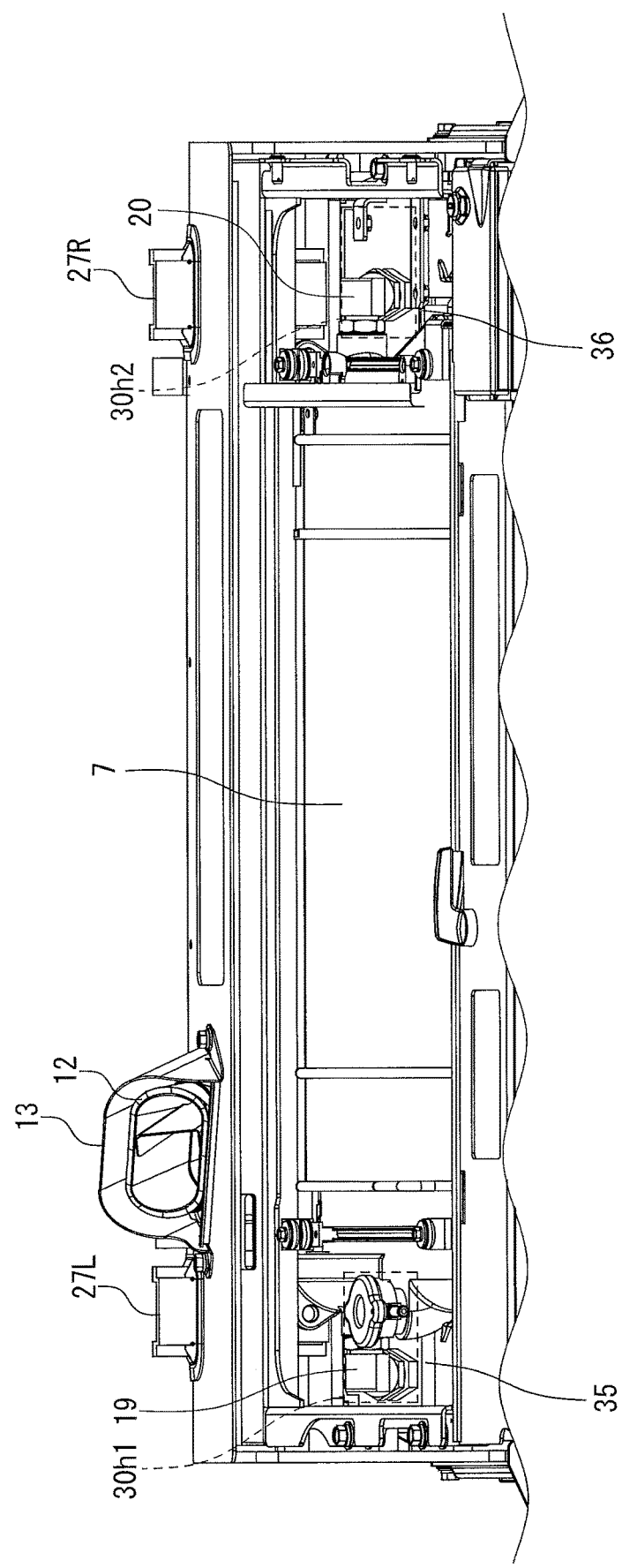
FIG. 7 is a perspective view of a heat exchanger as viewed from above when a bonnet cover is removed.

FIG. 7 is a perspective view of the heat exchanger 7 as viewed from above when the bonnet cover 8 is removed. Referring to FIGS. 6 and 7, the heat exchanger 7 is connected to hoses 19 and 20 which are connected to the engine 6 and the hydraulic system. Coolant and hydraulic oil are circulated between the heat exchanger 7, the engine 6 and the hydraulic system via hoses 19 and 20. The hose 19 extends toward the gap G0 through an opening 30h1 provided in the stay 30. The hose 20 extends toward the gap G0 through an opening 30h2 provided in the stay 30. A work vehicle 1 includes a seal 35 for closing an opening 30h1 and a seal 36 for closing an opening 30h2. The seal 35 and the seal 36 prevent dust accumulated in the space surrounded by the stay 30 from falling into the engine room 14.

The engine room 14 is a space surrounded by the cabin 5, the fan duct 18, the first inner wall 21L, the second inner wall 21R, the bottom wall 25, and the rear bonnet cover 9. That is, it can be said that the bonnet cover 8 covers the engine room 14, and the vehicle body rear portion 2R has the engine room 14 below the upper support frame 24 in the height direction $D_H$ along the height of the vehicle body frame 2. When it is opened as shown in FIG. 2, the lower part of the upper support frame 24 shown in FIG. 5 is exposed to the outside. That is, in the open state, the engine room 14 is exposed between the front portion 2F of the vehicle body and the cab frame 53. The engine 6 and the exhaust treatment device 15 are provided in the engine room 14.

The exhaust treatment device 15 is provided in the engine room 14 at the front $D_F$ of the engine 6, and is connected to the engine 6 by a connection pipe 16. The connection pipe 16 is connected at the right end of the exhaust treatment device 15. As shown in FIG. 5, the air supply port of the exhaust pipe 11 is connected at the left end of the exhaust treatment device 15. An exhaust port 12 is provided on the side of the exhaust pipe 11 opposite to the air supply port. The exhaust port 12 is fixed to the exhaust pipe 11 by press-fitting, adhesive, welding or the like. That is, the exhaust pipe 11 has the exhaust port 12. As shown in FIGS. 5 and 6, the exhaust port 12 is protected by being covered with the muffler cover 13. That is, the exhaust system 10 includes a muffler cover 13. The muffler cover 13 is fixed to the bonnet cover 8 by bolts B1, B2 or the like. As shown in FIGS. 3 and 6, the exhaust port 12 faces the air suction port 8a.

Figure 8:
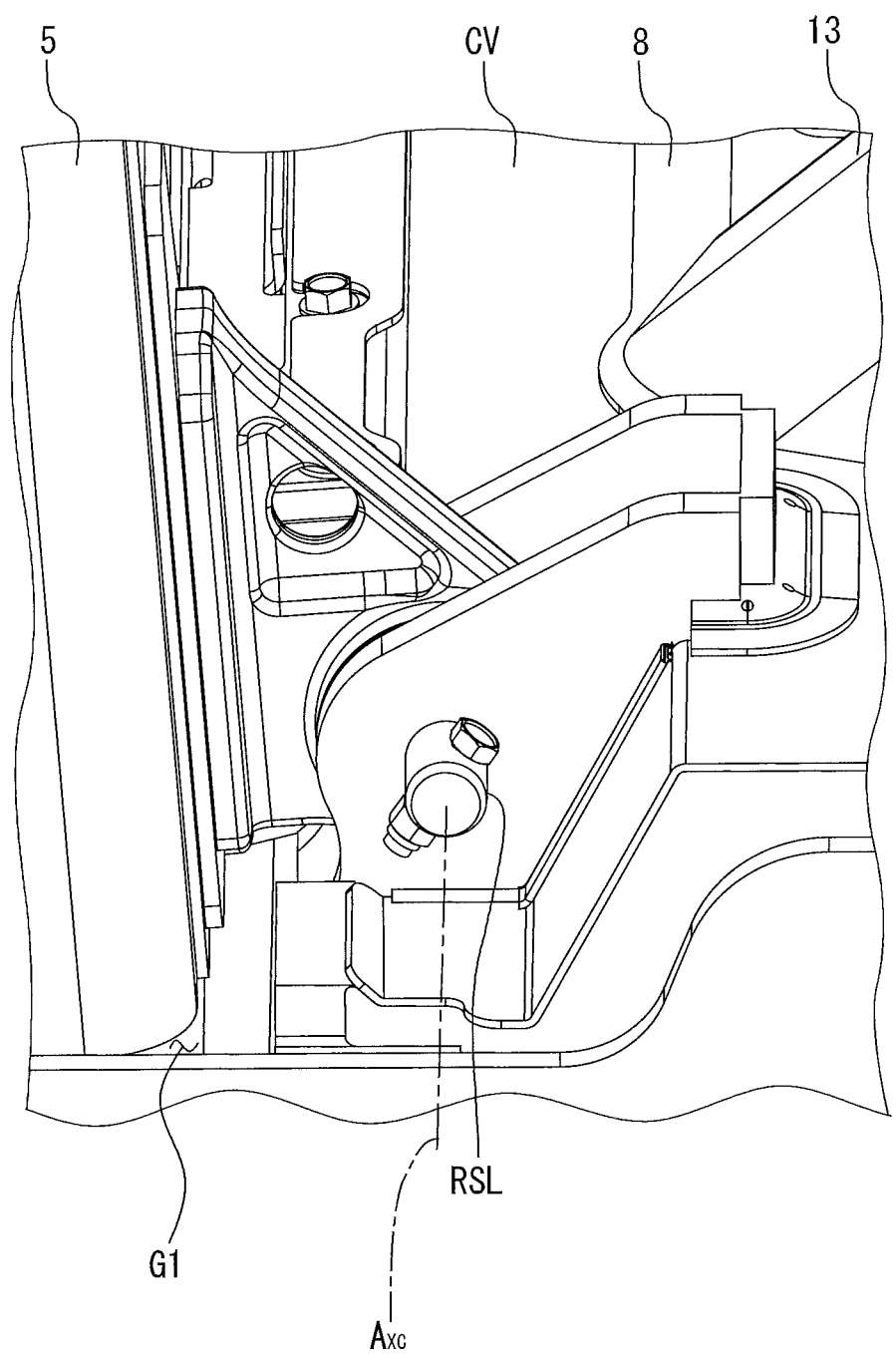
FIG. 8 is an enlarged view of the boundary between the cabin and the bonnet cover.

FIG. 8 is an enlarged view of the boundary portion between the cabin 5 and the bonnet cover 8. Referring to FIGS. 6 and 8, in a closed state in which the cab frame 53 is placed on the front portion 2F of the vehicle body, the upper support frame 24 and the cab frame 53 are separated from each other. That is, the work vehicle 1 is provided with the first gap G1 between the upper support frame 24 and the cab frame 53. When rotating the cabin 5, the operator can lift the cabin 5 by placing his/her hand into the first gap G1. Referring to FIGS. 3 and 8, the work vehicle 1 has a cover CV that covers the upper support frame 24 between the first support base 27L and the second support base 27R. That is, the cover CV covers the upper support frame 24 between the vehicle body center M and the first support base 27L in the axial direction $D_{AX}$ above the height direction $D_H$. The cover CV covers the upper support frame 24 between the vehicle body center M and the second support base 27R in the axial direction $D_{AX}$ above the height direction $D_H$. Accordingly, the cover CV covers the gap between the cab frame 53 between the first support base 27L and the second support base 27R and the upper support frame 24. The cover CV is made of cloth and is configured to be bent when the cabin 5 is rotated. Referring to FIGS. 2 and 6, the cabin 5 has outer peripheral seals 54L and 54R on the outer periphery of its bottom. In the closed state, the outer circumferential seals 54L and 54R are provided so as to come into contact with extending portions 21LE and 21RE extending from the first inner wall 21L and the second inner wall 21R of FIG. 5 to the inside of the vehicle body. Therefore, the first gap G1 is positioned outside the cover CV in the axial direction $D_{AX}$ and behind the extending portions 21LE and 21RE in the front-back direction $D_{FB}$.

<Dust Intrusion Prevention Mechanism>

Figure 9:
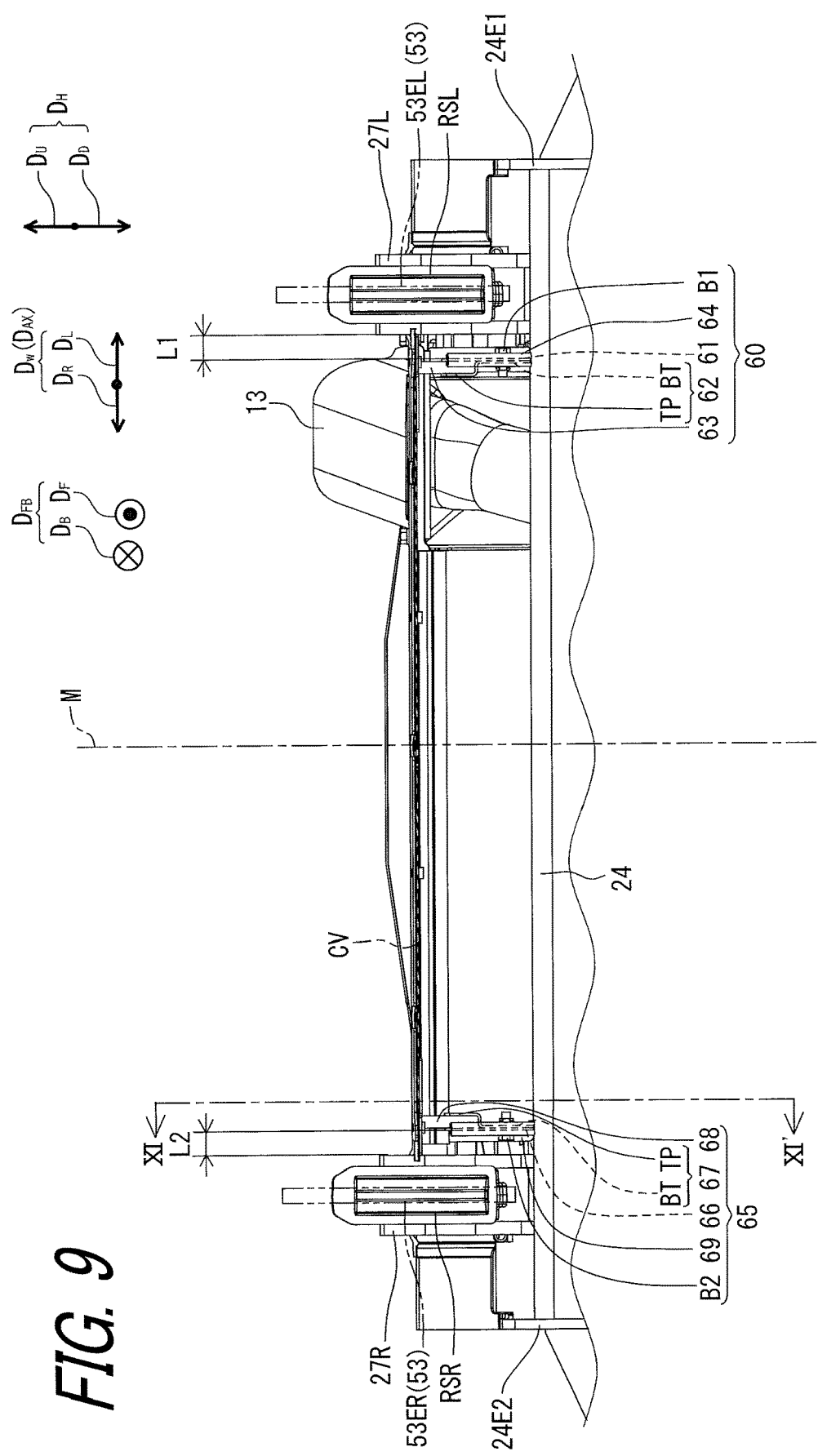
FIG. 9 is an enlarged view of the vicinity of an upper support frame of FIG. 5 according to the first embodiment.
Figure 10:
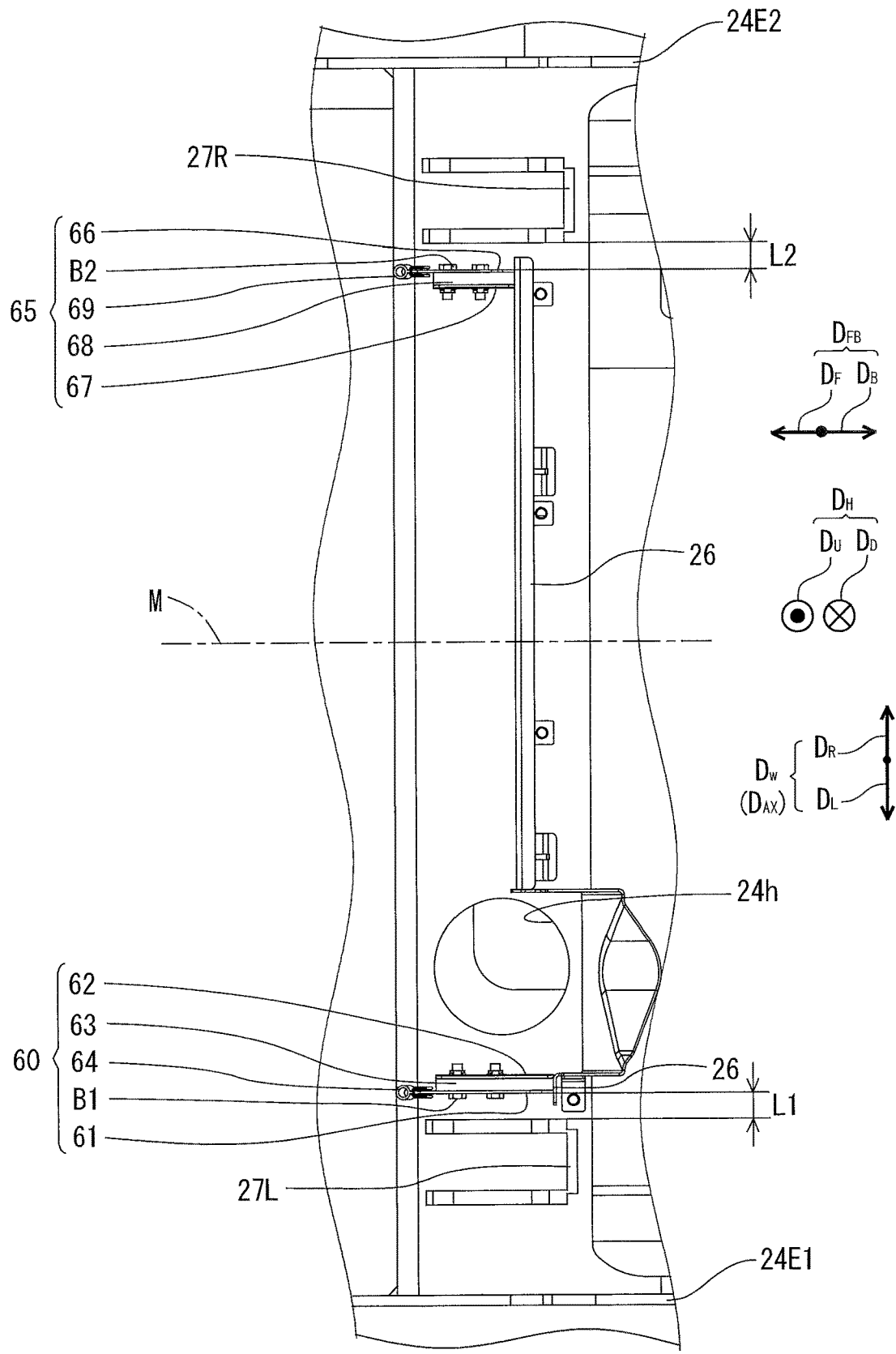
FIG. 10 is an upper enlarged view near the upper support frame of FIG. 5 according to the first embodiment.

A work vehicle 1 is provided with a first dust intrusion prevention mechanism 60 and a second dust intrusion prevention mechanism 65. The first dust intrusion prevention mechanism 60 and the second dust intrusion prevention mechanism 65 are provided between the vehicle body frame 2 and the cab frame 53. FIG. 9 is an enlarged view of the vicinity of the upper support frame 24 of FIG. 5 according to the first embodiment. FIG. 10 is an upper enlarged view near the upper support frame 24 of FIG. 5 according to the first embodiment. In FIG. 10, the illustration of the cover CV is omitted. Referring to FIGS. 5, 9 and 10, the first dust intrusion prevention mechanism 60 is provided between the first support base 27L and the second support base 27R in the axial direction $D_{AX}$ and between the upper support frame 24 and the cover CV in the height direction $D_H$. The second dust intrusion prevention mechanism 65 is provided between the first dust intrusion prevention mechanism 60 and the second support base 27R in the axial direction $D_{AX}$ and between the upper support frame 24 and the cover CV in the height direction $D_H$. In other words, the first dust intrusion prevention mechanism 60 is located between the vehicle body center M and the first end 24E1 in the axial direction $D_{AX}$ and is located between the upper support frame 24 and the cover CV in the height direction $D_H$. The second dust intrusion prevention mechanism 65 is provided between the vehicle body center M and the second end 24E2 in the axial direction $D_{AX}$, and between the upper support frame 24 and the cover CV in the height direction $D_H$.

The first dust intrusion prevention mechanism 60 comprises a second lower plate member 61, a third lower plate member 62, an elastic member 63, and an additional elastic member 64. The second dust intrusion prevention mechanism 65 comprises a second lower plate member 66, a third lower plate member 67, an elastic member 68, and an additional elastic member 69. The second lower plate member 61, the third lower plate member 62, the elastic member 63, and the additional elastic member 64 have the same structure as the second lower plate member 66, the third lower plate member 67, the elastic member 68, and the additional elastic member 69, respectively, except for the difference in the length of the $D_{FB}$ in the front-back direction of the second lower plate member 61, 66, the difference in the length of the $D_{FB}$ in the front-back direction of the third lower plate member 62, 67, and the difference in the length of the $D_{FB}$ in the front-back direction of the elastic members 63, 68. Therefore, in the following description, the structure of the second dust intrusion prevention mechanism 65 will be mainly used, but the detailed description of the structure of the first dust intrusion prevention mechanism 60, which overlaps with the structure, will be omitted.

Figure 11:
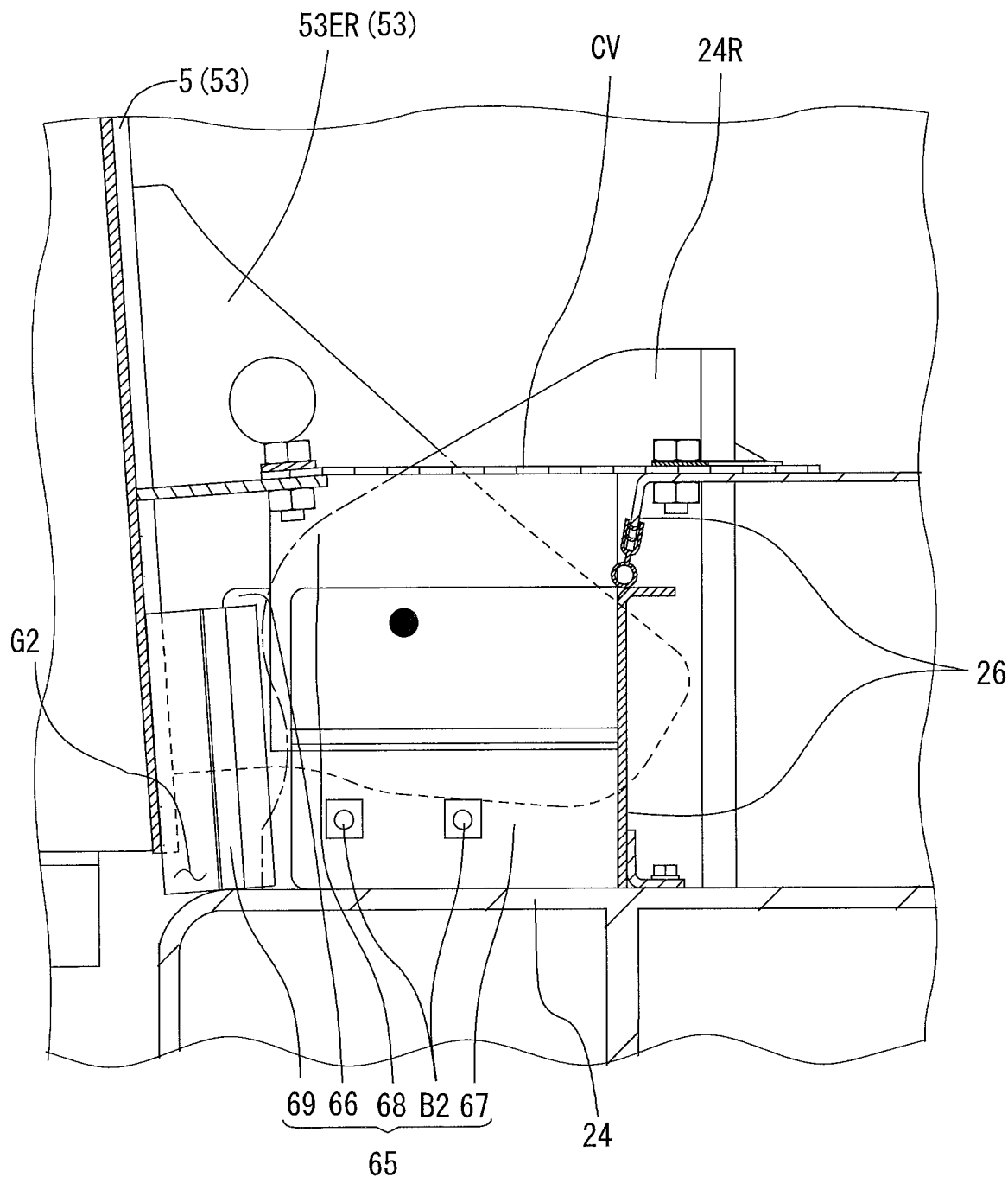
FIG. 11 is a cross-sectional view taken along section line XI-XI' of FIG. 3 according to the first embodiment.

FIG. 11 is a cross-sectional view taken along section line XI-XI' of FIG. 3 according to the first embodiment. Referring to FIGS. 9 and 11, the second lower plate member 66 (61) is provided above the upper support frame 24 and extends above in a height direction from the upper support frame 24. The third lower plate member 67 (62) includes a bottom portion BT connected to the second lower plate member 66 (61) and an upper portion TP bent from the bottom portion BT to be separated from the second lower plate member 66 (61) and extending upward. The second lower plate member 66 (61) and the third lower plate member 67 (62) are separated from the cover CV in the height direction $D_H$. The elastic member 68 (63) is sandwiched between the second lower plate member 66 (61) and the third lower plate member 67 (62). The elastic member 68 (63) abuts the cover CV in the above closed state. FIG. 11 shows the shape of the cover CV in the closed state. Referring to FIGS. 9-11, the additional elastic member 69 (64) is provided at the front end of the front-back direction $D_{FB}$ perpendicular to the height direction $D_H$ and the axial direction $D_{AX}$ of the second lower plate member 66 (61). Referring to FIGS. 6 and 11, the additional elastic member 69 (64) comes into contact with the cab frame 53 in the closed state.

Referring to FIG. 6, the cab frame 53 includes a support plate 53EL for supporting the rotational shaft RSL. When viewed in the axial direction $D_{AX}$, the first dust intrusion prevention mechanism 60 overlaps with a gap G2 between the cab frame 53, the upper support frame 24, the first support base 27L, and the cover CV. Referring to FIGS. 9 and 10, the first dust intrusion prevention mechanism 60 and the first support base 27L are close to each other in the axial direction $D_{AX}$. Referring to FIG. 11, the cab frame 53 includes a support plate 53ER for supporting the rotational shaft RSR. The second dust intrusion prevention mechanism 6r overlaps with the gap G2 between the cab frame 53, the upper support frame 24, the second support base 27R, and the cover CV as viewed in the axial direction $D_{AX}$. In FIG. 11, in order to clarify the outer shapes of the cab frame 53 and the second support base 27R, the hidden lines of the outer shape of the cab frame 53 (support plate 53ER) are shown by dotted lines, and the hidden lines of the outer shape of the second support base 27R are shown by dashed lines. Referring to FIGS. 9 and 10, the second dust intrusion prevention mechanism 65 and the second support base 27R are close to each other in the axial direction $D_{AX}$. The distance L2 in the axial direction $D_{AX}$ between the second dust intrusion prevention mechanism 65 and the second support base 27R is substantially equal to the distance L1 in the axial direction $D_{AX}$ between the first dust intrusion prevention mechanism 60 and the first support base 27L.

Referring to FIGS. 10 and 11, the vehicle body frame 2 further includes an extended frame 26 extending upward in the height direction $D_H$ from the upper support frame 24 and connected to the cover CV. The third lower plate member 67 (62) is connected to an extended frame 26 at rear end in the front-back direction $D_{FB}$. Referring to FIG. 5, the exhaust treatment device 15 is positioned between the first dust intrusion prevention mechanism 60 and the second dust intrusion prevention mechanism 65 in the axial direction $D_{AX}$. Therefore, it becomes difficult for dust from the outside air to reach the exhaust treatment device 15. More specifically, although dust from the outside air falls as in flow F1 in FIG. 5, dust heading toward the inside of the vehicle as in flow F2 is stopped by the first dust intrusion prevention mechanism 60 and the second dust intrusion prevention mechanism 65. As a result, it is possible to reduce the risk of the dust being burned by the exhaust treatment device 15 which emits high heat.

<Operation and Effect of First Embodiment>

In the work vehicle 1 according to the first embodiment, the first dust intrusion prevention mechanism 60 (second dust intrusion prevention mechanism 65) overlaps with the gap G2 between the cab frame 53, the upper support frame 24, the first support base 27L (second support base 27R), and the cover CV when viewed in the axial direction $D_{AX}$. As a result, the work vehicle 1 can prevent dust from entering through the gap between the upper support frame 24 and the cabin 5 in the portion covered with the cover CV.

The distance L1 of the axial direction $D_{AX}$ between the first dust intrusion prevention mechanism 60 and the first support base 27L is shorter than the width W1 of the axial direction $D_{AX}$ of the first support base 27L. The distance L2 in the axial direction $D_{AX}$ between the second dust intrusion prevention mechanism 65 and the second support base 27R is shorter than the width W2 in the axial direction $D_{AX}$ of the second support base 27R. Since the air passage is narrowed by the approach of the first dust intrusion prevention mechanism 60 and the first support base 27L and the approach of the second dust intrusion prevention mechanism 65 and the second support base 27R, dust intrusion from the gap between the upper support frame 24 and the cabin 5 in the portion covered by the cover CV can be further prevented.

Both the first dust intrusion prevention mechanism 60 and the second dust intrusion prevention mechanism 65 include a third lower plate member 67 (62) which is connected to the extended frame 26 at the rear end of the front-back direction $D_{FB}$, an elastic member 68 (63) which comes into contact with the cover (CV) in the closed state, and an additional elastic member 69 (64) which comes into contact with the cab frame 53 in the closed state. Thus, in the closed state, most of the gap surrounded by the cab frame 53, the upper support frame 24, the extended frame 26, and the cover CV can be closed, so that dust can be further prevented from entering through the gap between the upper support frame 24 and the cabin 5 in the portion covered by the cover CV.

Second Embodiment

The shapes of the first dust intrusion prevention mechanism 60 and the second dust intrusion prevention mechanism 65 are not limited to the shapes shown in the first embodiment. Hereinafter, another configuration of the first dust intrusion prevention mechanism 60 and the second dust intrusion prevention mechanism 65 will be described as the first dust intrusion prevention mechanism 70 and the second dust intrusion prevention mechanism 75. Since the construction of the work vehicle 1 according to the second embodiment is the same except for the first dust intrusion prevention mechanism 70 and the second dust intrusion prevention mechanism 75, the description of the construction is omitted. The configurations of the first dust intrusion prevention mechanism 70 and the second dust intrusion prevention mechanism 75, which have not been described in the second embodiment, are the same as the configurations of the first dust intrusion prevention mechanism 60 and the second dust intrusion prevention mechanism 65 in the first embodiment.

Figure 12:
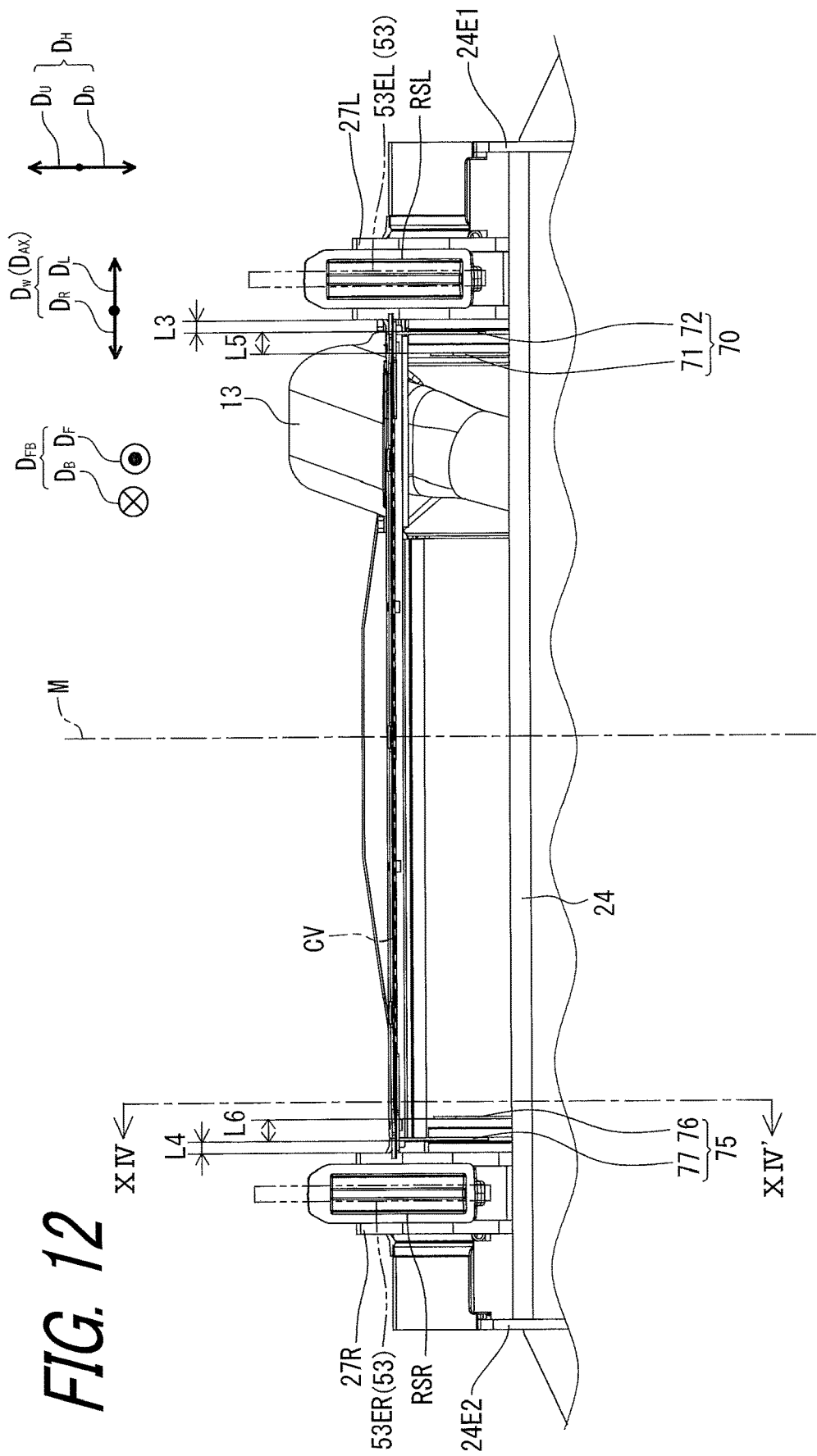
FIG. 12 is an enlarged view of the vicinity of the upper support frame of the second embodiment.
Figure 13:
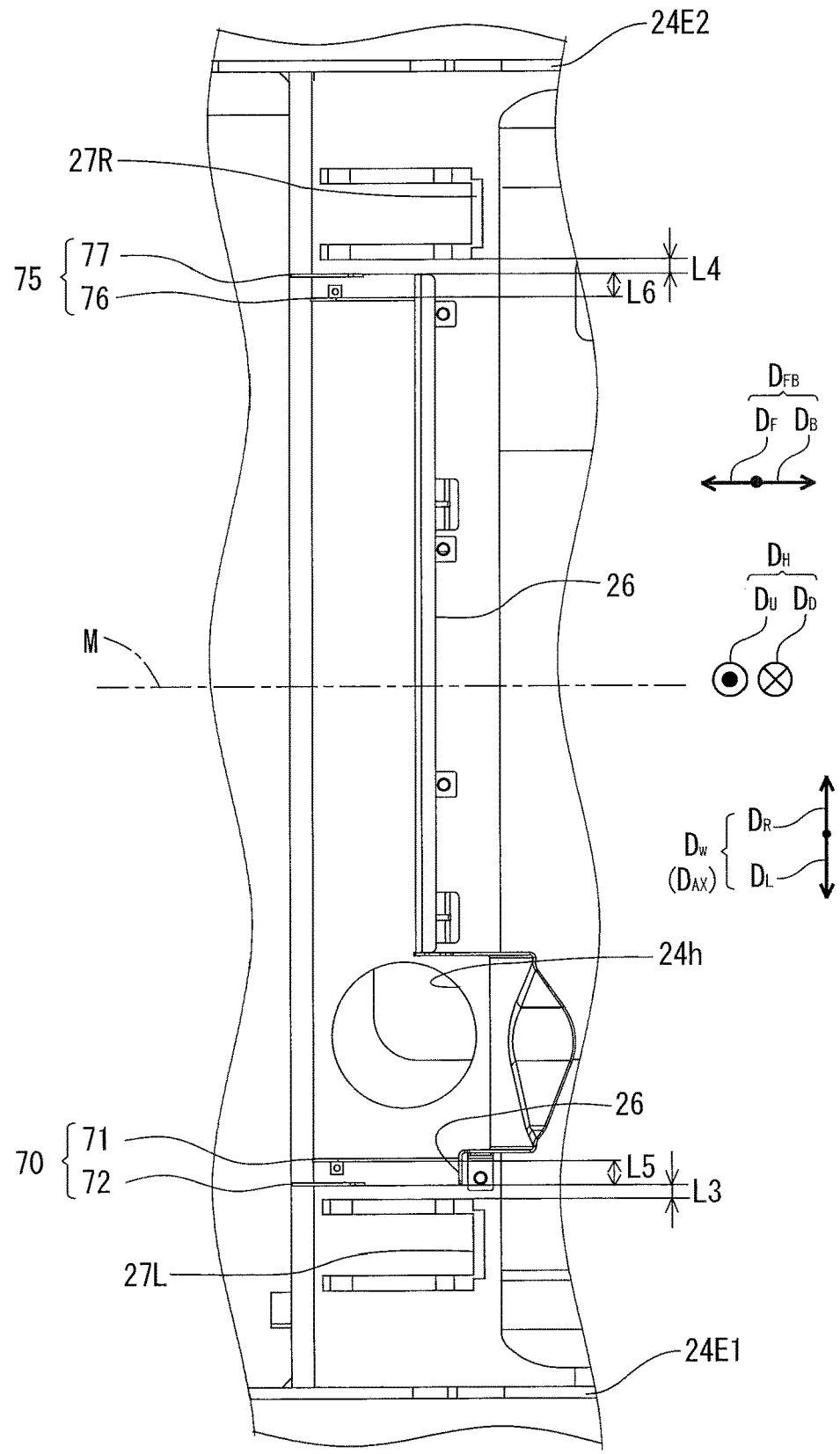
FIG. 13 is an upper enlarged view of the vicinity of the upper support frame of the second embodiment.
Figure 14:
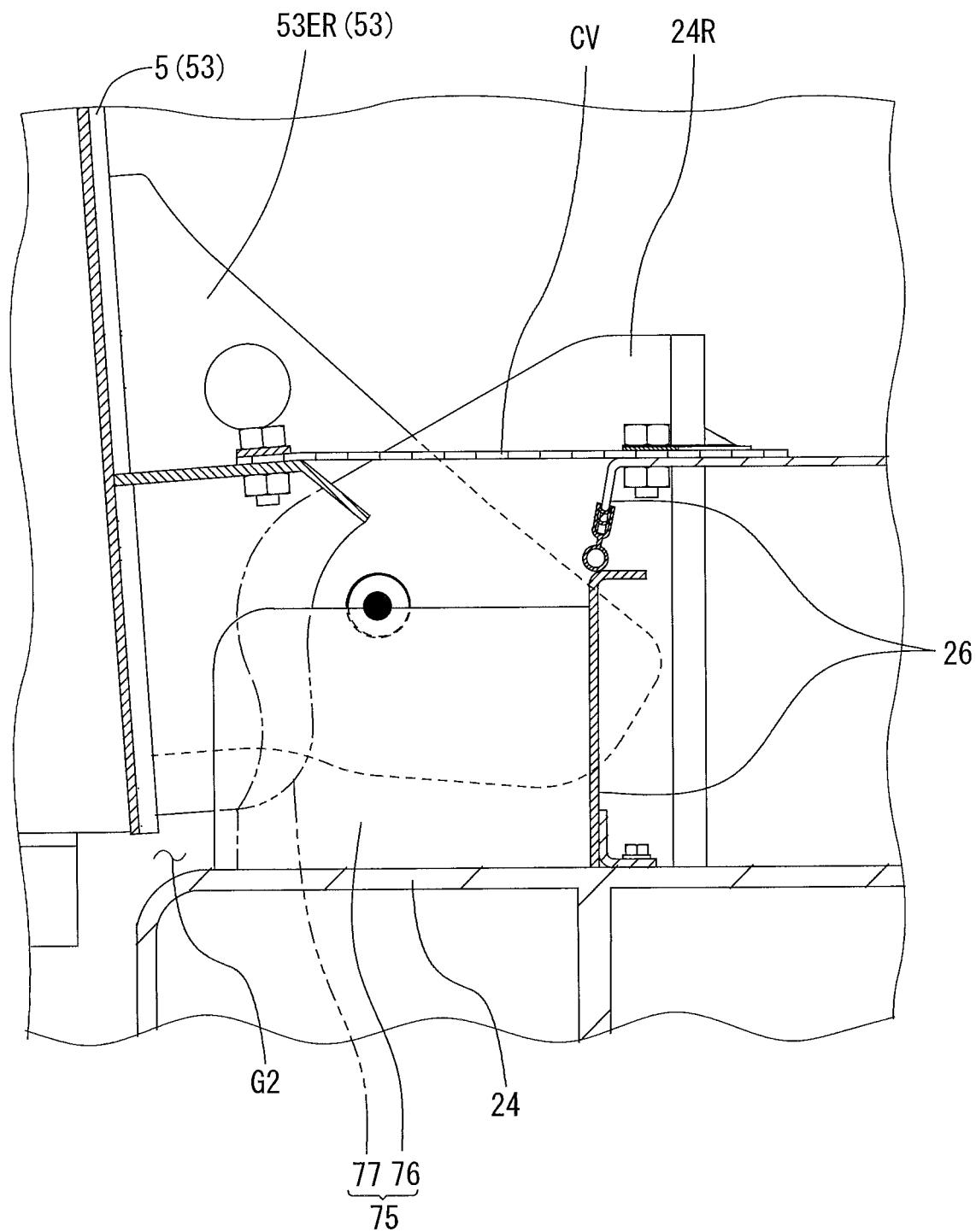
FIG. 14 is a cross-sectional view taken along section line XI-XI' of FIG. 3 in a second embodiment.

FIG. 12 is an enlarged view of the vicinity of the upper support frame 24 of the second embodiment. FIG. 13 is an upper enlarged view of the vicinity of the upper support frame 24 of the second embodiment. In FIG. 13, the illustration of the cover CV is omitted. FIG. 14 is a sectional view taken along a section line XI-XI' of FIG. 3 in the second embodiment. The first dust intrusion prevention mechanism 70 has a first lower plate member 71 and a first upper plate member 72. The second dust intrusion prevention mechanism 75 has a first lower plate member 76 and a first upper plate member 77. The first lower plate member 71 and the first upper plate member 72 have the same structure as the first lower plate member 76 and the first upper plate member 77, respectively, except for the difference in the length of the $D_{FB}$ in the front-back direction of the first lower plate members 71 and 76. Therefore, in the following description, the structure of the second dust intrusion prevention mechanism 75 will be mainly used, but a detailed description of the structure of the first dust intrusion prevention mechanism 70, which overlaps with the structure, will be omitted. In FIG. 14, in order to clarify the outer shapes of the cab frame 53, the second support base 27R, and the first upper plate member 72, the hidden lines of the outer shape of the cab frame 53 (the support plate 53ER) are shown by dotted lines, the hidden lines of the outer shape of the second support base 27R are shown by one dot chain lines, and the hidden lines of the outer shape of the first upper plate member 72 are shown by two dot chain lines.

Referring to FIG. 14, the first dust intrusion prevention mechanism 70 and the second dust intrusion prevention mechanism 75 are provided between the vehicle body frame 2 and the cab frame 53. Referring to FIGS. 12 and 13, the first dust intrusion prevention mechanism 70 is provided between the first support base 27L and the second support base 27R in the axial direction $D_{AX}$ and between the upper support frame 24 and the cover CV in the height direction $D_H$. The second dust intrusion prevention mechanism 75 is arranged in the axial direction $D_{AX}$ between the first dust intrusion prevention mechanism 60 and the second support base 27R and is arranged in the height direction $D_H$ between the upper support frame 24 and the cover CV. In other words, the first dust intrusion prevention mechanism 70 is provided in the axial direction $D_{AX}$ between the vehicle body center M and the first end 24E1, and is provided in the height direction $D_H$ between the upper support frame 24 and the cover CV. The second dust intrusion prevention mechanism 75 is provided between the vehicle body center M and the second end 24E2 in the axial direction $D_{AX}$ and between the upper support frame 24 and the cover CV in the height direction $D_H$.

Referring to FIGS. 12 and 14, the first upper plate member 72 is provided between the first lower plate member 71 and the first support base 27L in the axial direction $D_{AX}$. The first upper plate member 77 is provided between the first lower plate member 76 and the second support base 27R in the axial direction $D_{AX}$. The distance L5 between the first upper plate member 72 and the first lower plate member 71 in the axial direction $D_{AX}$ is smaller than the width W1 of the axial direction $D_{AX}$ of the first support base 27L, and the distance L3 between the first upper plate member 72 and the first support base 27L in the axial direction $D_{AX}$ is smaller than the width W1 of the axial direction $D_{AX}$ of the first support base 27L. In other words, the distance L3 of the axial direction $D_{AX}$ between the first dust intrusion prevention mechanism 70 and the first support base 27L is shorter than the width W1 of the axial direction $D_{AX}$ of the first support base 27L. The distance L6 between the first upper plate 77 and the first lower plate member 76 in the axial direction $D_{AX}$ is smaller than the width W2 of the second support base 27R in the axial direction $D_{AX}$, and the distance L4 between the first upper plate 77 and the second support base 27R in the axial direction $D_{AX}$ is smaller than the width W2 of the second support base 27R in the axial direction $D_{AX}$. In other words, the distance L4 in the axial direction $D_{AX}$ between the second dust intrusion prevention mechanism 75 and the second support base 27R is shorter than the width W2 in the axial direction $D_{AX}$ of the second support base 27R. The distance L4 is substantially equal to the distance L3, and the distance L6 is substantially equal to the distance L5.

The first lower plate member 76 (71) is provided on the upper support frame 24 and extends upward from the upper support frame 24 in the height direction $D_H$. The first lower plate member 76 (71) is connected to the extended frame 26 at the rear end of the front-back $D_{FB}$. When viewed in the axial direction $D_{AX}$, the second support base 27R (first support base 27L) overlaps with most of the first lower plate member 76 (71). Referring to FIGS. 12 and 14, the first upper plate member 77 (72) is separated from the upper support frame 24 in the height direction $D_H$. Referring to FIG. 14, the first upper plate 77 (72) is provided on the cover CV and extends downward from the cover CV in the height direction $D_H$. The first upper plate member 77 (72) has a shape in which the width becomes narrower in the front-back direction $D_{FB}$ perpendicular to the height direction $D_H$ and the axial direction $D_{AX}$ as it goes downward in the height direction $D_H$ in the closed state. As a result, the first upper plate member 77 (72) is prevented from coming into contact with the extended frame 26 when the cabin 5 rotates.

Referring to FIG. 14, the first upper plate member 77 (72) overlaps with the gap G2 between the cab frame 53, the first lower plate member 76 (71), the first support base 27L, and the cover CV when viewed in the axial direction $D_{AX}$ in the closed state. In other words, the first dust intrusion prevention mechanism 70 overlaps with the gap G2 between the cab frame 53, the upper support frame 24, the first support base 27L, the first support base 27L, and the cover CV as viewed in the axial direction $D_{AX}$. The second dust intrusion prevention mechanism 75 overlaps with the gap G2 between the cab frame 53, the upper support frame 24, the second support base 27R, and the cover CV as viewed in the axial direction $D_{AX}$.

<Operation and Effect of Second Embodiment>

Also in the work vehicle 1 according to the second embodiment, the first dust intrusion prevention mechanism 70 (second dust intrusion prevention mechanism 75) overlaps with the gap G2 between the cab frame 53, the upper support frame 24, the first support base 27L (second support base 27R), and the cover CV as viewed in the axial direction $D_{AX}$. As a result, the work vehicle 1 can prevent dust from entering through the gap between the upper support frame 24 and the cabin 5 in the portion covered with the cover CV.

The first upper plate member 77 (72) is provided between the first lower plate member 71 and the second support base 27R (first support base 27L) in the axial direction $D_{AX}$. The first lower plate member 76 (71) is separated from the cover CV in the height direction $D_H$. The first upper plate member 77 (72) is separated from the upper support frame 24 in the height direction $D_H$. The distance L5 between the first upper plate member 72 and the first lower plate member 71 in the axial direction $D_{AX}$ is smaller than the width W1 of the axial direction $D_{AX}$ of the first support base 27L, and the distance L3 between the first upper plate member 72 and the first support base 27L in the axial direction $D_{AX}$ is smaller than the width W1 of the axial direction $D_{AX}$ of the first support base 27L. The distance L6 between the first upper plate 77 and the first lower plate member 76 in the axial direction $D_{AX}$ is smaller than the width W2 of the second support base 27R in the axial direction $D_{AX}$, and the distance L4 between the first upper plate 77 and the second support base 27R in the axial direction $D_{AX}$ is smaller than the width W2 of the second support base 27R in the axial direction $D_{AX}$. Therefore, a labyrinth structure having a narrow air passage is formed by the first dust intrusion prevention mechanism 70 and the first support base 27L, and a labyrinth structure having a narrow air passage is formed by the second dust intrusion prevention mechanism 75 and the second support base 27R. Therefore, it is possible to further prevent dust from entering through the gap between the upper support frame 24 and the cabin 5 in the portion covered with the cover CV.

Both a first dust intrusion prevention mechanism 60 and a second dust intrusion prevention mechanism 65 include a first lower plate member 76 (71) which is connected to an extended frame 26 at the rear end of a front-back direction $D_{FB}$, and a first upper plate member 77 (72) which covers a gap G2 between a cab frame 53, a first lower plate member 76 (71), a first support base 27L, and a cover CV as viewed in an axial direction $D_{AX}$ in a closed state. Thus, in the closed state, most of the gap surrounded by the cab frame 53, the upper support frame 24, the extended frame 26, and the cover CV can be closed, so that dust can be further prevented from entering through the gap between the upper support frame 24 and the cabin 5 in the portion covered by the cover CV.

Modified Example

In the above-described embodiment, the first dust intrusion prevention mechanism 60 (70) and the second dust intrusion prevention mechanism 65 (75) are provided inside of the axial direction $D_{AX}$ of the first support base 27L and the second support base 27R, respectively. However, it may be provided outside of the axial direction $D_{AX}$. In this case, it is desirable that a cover such as a cover CV is provided above the first dust intrusion prevention mechanism 60 (70) and the second dust intrusion prevention mechanism 65 (75).

"Comprising" and derivatives thereof are non-limiting terms describing the presence of an element and do not exclude the presence of other elements not described. This also applies to "have," "include," and derivatives thereof.

The terms "member", "part", "element", "body", and "structure" may have multiple meanings, such as a single part or a plurality of parts.

Ordinal numbers such as "first" and "second" are merely terms used to identify the structure and have no other meaning (e.g., a particular order). For example, the existence of the "first element" does not imply the existence of the "second element", and the existence of the "second element" does not imply the existence of the "first element".

Terms such as "substantially", "about", and "approximately" to indicate the degree may mean a reasonable amount of deviation such that the final result does not change significantly, unless otherwise stated in the embodiments. All numerical values set forth herein may be construed to include words such as "substantially", "about", and "approximately".

In this application, the phrase "at least one of A and B" should be interpreted to include only A, only B, and both A and B.

It is apparent from the above disclosure that various modifications and modifications of the present invention are possible. Accordingly, the present invention may be carried out by a method different from the specific disclosure of the present application without departing from the spirit of the present invention.

What is claimed is:

1. A work vehicle comprising:
   a cab frame defining a cabin;
   a vehicle body frame comprising:
      a vehicle body front portion on which the cab frame is configured to be mounted; and
      a vehicle body rear portion provided opposite to the vehicle body front portion in a front-back direction, the vehicle body rear portion comprising an engine room and an upper support frame provided above the engine room in a height direction perpendicular to the front-back direction;
   a cover attached to the cab frame and configured to cover a space provided above the upper support frame in the height direction when the cab frame is mounted on the vehicle body front portion, the cover having a first edge and a second edge opposite to the first edge in a width direction perpendicular to the front-back direction and the height direction;
   the vehicle body rear portion further comprising a first support base provided on the upper support frame opposite to the engine room in the height direction such that the first edge of the cover is configured to abut on the first support base, the first support base supporting the cab frame rotatably about a cab rotational axis extending in the width direction such that the cab frame is separable from the vehicle body front portion; and
   a first dust intrusion prevention mechanism provided between the upper support frame and the cover in the height direction and provided in a gap defined by the cab frame, the upper support frame, the first support base, and the cover as viewed in the width direction when the cab frame is mounted on the vehicle body front portion.

2. The work vehicle according to claim 1, further comprising:
   a second dust intrusion prevention mechanism provided between the upper support frame and the cover in the height direction;
   the vehicle body rear portion further comprising a second support base provided on the upper support frame opposite to the engine room in the height direction such that the second edge of the cover is configured to abut on the second support base, the second support base supporting the cab frame rotatably about the cab rotational axis; and
   the second dust intrusion prevention mechanism is provided in a gap defined by the cab frame, the upper support frame, the second support base, and the cover as viewed in the width direction when the cab frame is mounted on the vehicle body front portion.

3. The work vehicle according to claim 2, wherein the first support base and the second support base are provided on the upper support frame at positions symmetrical to each other with respect to a vehicle body center which is a middle of the upper support frame in the width direction.

4. The work vehicle according to claim 2, further comprising:
   an engine provided in the engine room; and
   an exhaust treatment device provided in the engine room, configured to treat exhaust gas from the engine,
   wherein the exhaust treatment device is positioned between the first dust intrusion prevention mechanism and the second dust intrusion prevention mechanism in the width direction.

5. The work vehicle according to claim 1, wherein the first dust intrusion prevention mechanism comprises
   a first lower plate member provided on the upper support frame, extending upward in the height direction from the upper support frame, and separated from the cover in the height direction, and
   a first upper plate member provided on the cover and extending downward in the height direction from the cover, the first upper plate member being separated from the upper support frame in the height direction.

6. The work vehicle according to claim 5, wherein the first upper plate member covers a gap defined by the cab frame, the first lower plate member, the first support base, and the cover as viewed in the width direction in a closed state in which the cab frame is placed on the vehicle body front portion.

7. The work vehicle according to claim 6, wherein the first upper plate member has a shape that tapers downward in the height direction in the closed state.

8. The work vehicle according to claim 6, wherein the first upper plate member is provided between the first lower plate member and the first support base in the width direction.

9. The work vehicle according to claim 6,
wherein the first lower plate member is provided in a gap defined by the cab frame, the first upper plate member, the first support base, and the upper support frame as viewed along the cab rotational axis in the closed state.

10. The work vehicle according to claim 5,
wherein the vehicle body frame further includes an extended frame extending upward in the height direction from the upper support frame and connected to the cover, and
wherein the first lower plate member is connected to the extended frame at a rear end in the front-back direction.

11. The work vehicle according to claim 1,
wherein the first dust intrusion prevention mechanism comprises
a second lower plate member provided on the upper support frame and extending upward in the height direction from the upper support frame, the second lower plate member being separated from the cover in the height direction,
a third lower plate member including a bottom portion connected to the second lower plate member and an upper portion bent from the bottom portion to be separated from the second lower plate member and separated from the cover in the height direction, and
an elastic member sandwiched between the second lower plate member and the third lower plate member, and
wherein the elastic member comes into contact with the cover in a closed state in which the cab frame is placed on the vehicle body front portion.

12. The work vehicle according to claim 11,
wherein the first dust intrusion prevention mechanism further comprises an additional elastic member provided at a front end of the second lower plate member in the front-back direction, and
wherein the additional elastic member comes into contact with the cab frame in the closed state.

13. A work vehicle according to claim 11,
wherein the vehicle body frame further includes an extended frame extending upward in the height direction from the upper support frame and connected to the cover; and
wherein the third lower plate member is connected to the extended frame at a rear end in the front-back direction.

14. A work vehicle comprising:
a cab frame defining a cabin;
a vehicle body frame comprising:
a vehicle body front portion on which the cab frame is configured to be mounted; and
a vehicle body rear portion provided opposite to the vehicle body front portion in a front-back direction, the vehicle body rear portion comprising:
an upper support frame;
an engine room provided below the upper support frame in a height direction perpendicular to the front-back direction; and
a first support base and a second support base provided on the upper support frame opposite to the engine room in the height direction side by side in a width direction perpendicular to the front-back direction and the height direction, the first support base and the second support base supporting the cab frame rotatably about a cab rotational axis extending in the width direction such that the cab frame is separable from the vehicle body front portion;
a cover attached to the cab frame and configured to cover a space provided above the upper support frame in the height direction when the cab frame is mounted on the vehicle body front portion and between the first support base and the second support base in the width direction; and
a first dust intrusion prevention mechanism provided between the first support base and the second support base in the width direction and between the upper support frame and the cover in the height direction, the first dust intrusion prevention mechanism being provided in a gap defined by the cab frame, the upper support frame, the first support base, and the cover as viewed in the width direction when the cab frame is mounted on the vehicle body front portion.

15. The work vehicle according to claim 14, further comprising:
a second dust intrusion prevention mechanism provided between the first dust intrusion prevention mechanism and the second support base in the width direction and between the upper support frame and the cover in the height direction,
wherein the second dust intrusion prevention mechanism is provided in a gap defined by the cab frame, the upper support frame, the second support base, and the cover as viewed in the width direction.

16. The work vehicle according to claim 15, further comprising:
an engine provided in the engine room; and
an exhaust treatment device provided in the engine room, configured to treat exhaust gas from the engine,
wherein the exhaust treatment device is positioned between the first dust intrusion prevention mechanism and the second dust intrusion prevention mechanism in the width direction.

17. The work vehicle according to claim 14,
wherein the first support base and the second support base are provided on the upper support frame at positions symmetrical to each other with respect to a vehicle body center which is a middle of the upper support frame in the width direction.

18. The work vehicle according to claim 14,
wherein the first dust intrusion prevention mechanism comprises
a first lower plate member provided on the upper support frame, extending upward in the height direction from the upper support frame, and separated from the cover in the height direction, and
a first upper plate member provided on the cover and extending downward in the height direction from the cover, the first upper plate member being separated from the upper support frame in the height direction.

19. The work vehicle according to claim 18,
wherein the first upper plate member covers a gap defined by the cab frame, the first lower plate member, the first support base, and the cover as viewed in the width direction in a closed state in which the cab frame is placed on the vehicle body front portion.

20. The work vehicle according to claim 19,
wherein the first upper plate member has a shape that tapers downward in the height direction in the closed state.

* * * * *